United States Patent
Yuasa et al.

(10) Patent No.: US 8,018,490 B2
(45) Date of Patent: Sep. 13, 2011

(54) VEHICLE SURROUNDING IMAGE DISPLAY DEVICE

(75) Inventors: Mizuki Yuasa, Iwaki (JP); Shigeji Kubotani, Tokyo (JP)

(73) Assignee: Alpine Electronics, Inc., Fukushima (JP)

( * ) Notice: Subject to any disclaimer, the term of this patent is extended or adjusted under 35 U.S.C. 154(b) by 1330 days.

(21) Appl. No.: 11/562,860

(22) Filed: Nov. 22, 2006

(65) Prior Publication Data

US 2007/0165108 A1 Jul. 19, 2007

(30) Foreign Application Priority Data

Nov. 30, 2005 (JP) .................................. 2005-346699

(51) Int. Cl.
*H04N 7/18* (2006.01)
*G06K 9/00* (2006.01)

(52) U.S. Cl. ........................................ 348/148; 382/104

(58) Field of Classification Search .................. 348/148, 348/104, 222.1, 144, 153, 157; 340/932.2; 382/104

See application file for complete search history.

(56) References Cited

U.S. PATENT DOCUMENTS

| 6,366,221 B1 * | 4/2002 | Iisaka et al. ................. 340/932.2 |
| 7,027,616 B2 * | 4/2006 | Ishii et al. ..................... 382/104 |
| 7,266,219 B2 * | 9/2007 | Okamoto et al. ............. 382/104 |
| 7,307,655 B1 * | 12/2007 | Okamoto et al. .......... 348/222.1 |

FOREIGN PATENT DOCUMENTS

JP 10-257482 9/1998

* cited by examiner

*Primary Examiner* — Gims S Philippe
(74) *Attorney, Agent, or Firm* — Brinks Hofer Gilson & Lione (57) ABSTRACT

A vehicle surrounding image display device according to the present invention combines an image obtained by reducing in size an image taken by a camera provided at the center of the rear side of a vehicle, and images obtained by deforming images taken by cameras provided at the left and right sides of the vehicle such that the outward inclination of the inner side in the vehicle width direction of each of the left and right side images is gradually increased toward the lower end of the inner side. The vehicle surrounding image display device then generates a single image simulating the circumstances behind the user's own vehicle as observed from a single virtual viewpoint in a realistic form, and displays the generated image on a display device.

19 Claims, 5 Drawing Sheets

VEHICLE SURROUNDING IMAGE DISPLAY DEVICE

RELATED APPLICATIONS

The present application claims priority to Japanese Patent Application Number 2005-346699, filed Nov. 30, 2005, the entirety of which is hereby incorporated by reference.

BACKGROUND OF THE INVENTION

1. Field of the Invention

The present invention relates to a technique of providing a driver of a vehicle with an image showing the surroundings of the vehicle.

2. Description of the Related Art

Figure 5:
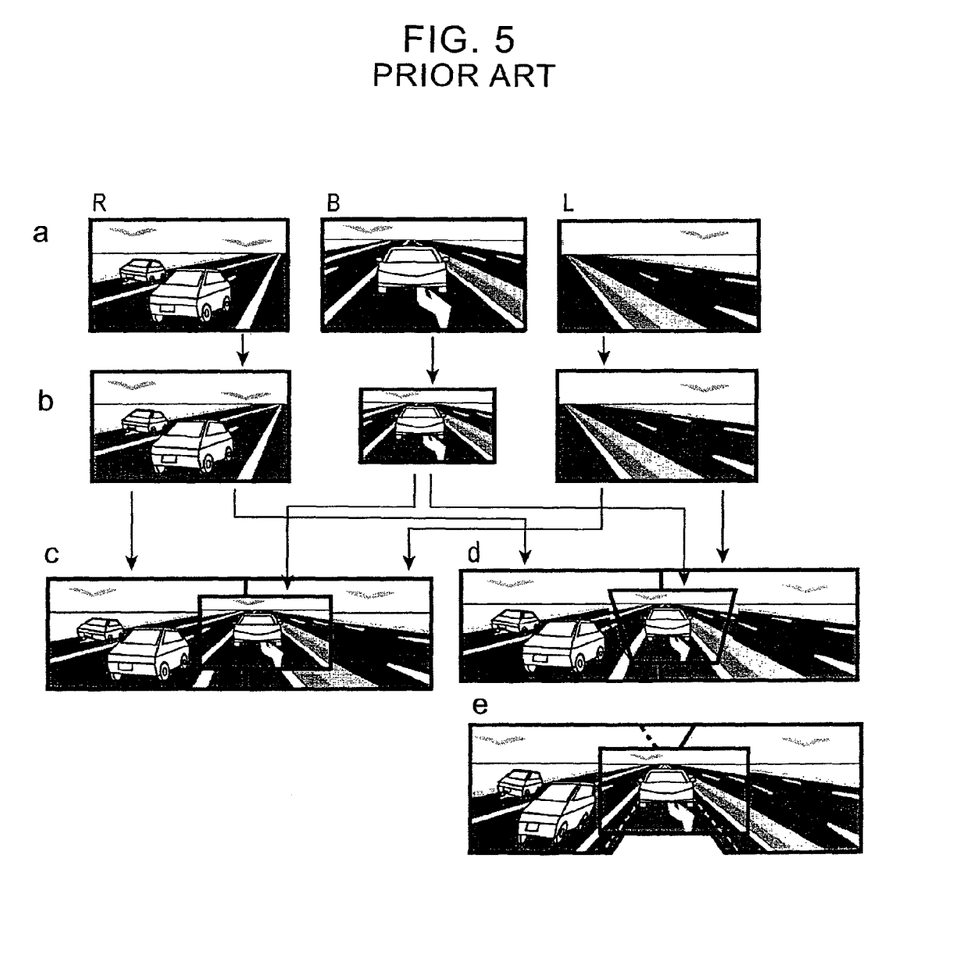

As a technique of providing a driver of a vehicle with an image of the surroundings of the vehicle, Japanese Unexamined Patent Application Publication No. 10-257482 (hereinafter referred to as the publicly known document), for example, describes a technique of generating and displaying a composite image synthesized from images behind the vehicle taken by three cameras provided at three locations, i.e., rearview mirrors on the left and right sides of the vehicle and the center of the rear side of the vehicle.

a to e in FIG. 5 are diagrams illustrating examples of an operation of generating a display image performed by a conventional vehicle surrounding image display device. According to the technique described in the above publicly known document, as illustrated in a in FIG. 5, images R, B, and L are taken by the camera provided with the rearview mirror on the right side of a vehicle, the camera provided at the center of the rear side of the vehicle, and the camera provided with the rearview mirror on the left side of the vehicle, respectively. In this case, as illustrated in b in FIG. 5, the enlargement ratios of the respective images are first adjusted such that the scales of objects included in the respective images become approximately the same. In the illustrated example, the image B taken by the camera provided at the rear side of the vehicle is reduced in size relative to the other images R and L such that the scales of objects included in the respective images become the same. Then, as illustrated in c in FIG. 5, the relatively size-reduced image B and the images R and L are combined such that the points at infinity (i.e., the vanishing points) of the respective images match one another. Thereby, a single image is generated which simulates the circumstances behind the user's own vehicle as observed from a single virtual viewpoint. Alternatively, as illustrated in d in FIG. 5, the size-reduced image B is deformed to be compressed in the horizontal direction at the lower portion thereof, and then is combined with the images R and L. Thereby, a single image is generated which simulates the circumstances behind the user's own vehicle as observed from a single virtual viewpoint.

According to the technique described in the above publicly known document, if the images taken by the respective cameras are combined just so as to match the points at infinity (i.e., the vanishing points) of the images, as illustrated in c in FIG. 5, white lines on the road surface and the like are not smoothly continued but are misaligned from one another at boundaries between the respective images due to the parallax among the respective cameras with respect to an object. This misalignment is increased at an area near the user's own vehicle, in which the parallax with respect to the object is increased, i.e., at a more conspicuous area. Meanwhile, as illustrated in d in FIG. 5, if the image taken by the camera provided at the center of the rear side of the vehicle is deformed to be compressed in the horizontal direction at the lower portion thereof, and is combined with the images taken by the cameras provided with the rearview mirrors on the left and right sides of the vehicle, the white lines on the road surface and the like can be smoothly continued to a certain extent, at least at the boundaries between the respective images near the user's own vehicle, by adjusting the degree of compression. With this configuration, however, the image of another vehicle located directly behind the user's own vehicle (i.e., another vehicle whose image is taken by the camera provided at the center of the rear side of the vehicle) is significantly distorted. Conversely, as illustrated in e in FIG. 5, if the images taken by the cameras provided with the rearview mirrors on the left and right sides of the vehicle are deformed such that the vertical side of each of the images close to the center is obliquely inclined, with the upper portion of the vertical side tilted toward the center, the white lines on the road surface and the like can be smoothly continued to a certain extent at the boundaries between the respective images near the user's own vehicle. In this case, however, while the significant distortion of the image of another vehicle located directly behind the user's own vehicle is suppressed, the images of other vehicles located diagonally behind the user's own vehicle on the left and right sides (i.e., other vehicles whose images are taken by the cameras provided with the rearview mirrors on the left and right sides of the vehicle) are significantly distorted.

Thus, the technique described in the publicly known document is unable to generate an image which simulates the circumstances behind a user's own vehicle as observed from a single virtual viewpoint in a sufficiently realistic form.

Accordingly, it is an object of the present invention to generate an image which simulates the circumstances behind a user's own vehicle as observed from a single virtual viewpoint in a form as realistic as possible on the basis of images behind the vehicle taken by a plurality of cameras, and to provide the generated image to a user of the vehicle.

SUMMARY OF THE INVENTION

To achieve the above object, the present invention provides a vehicle surrounding image display device mounted on a vehicle. The vehicle surrounding image display device includes a first camera, a second camera, an image deformation unit, an image synthesis unit, and a display device. The first camera takes a first image behind the vehicle from a central position in the width direction of the vehicle, while the second camera takes a second image behind the vehicle from a position off the center in the width direction of the vehicle. The image deformation unit deforms the second image taken by the second camera such that at least a portion of the inner side in the vehicle width direction of the second image lower than the vanishing point in the second image is inclined to make the lower portion of the inner side located more outward in the vehicle width direction than the upper portion of the inner side, and that the inclination is gradually increased toward the lower end of the inner side. The image synthesis unit adjusts the sizes of the second image deformed by the image deformation unit and the first image taken by the first camera such that the scale of an object matches between the first and second images, and generates a synthetic image combining the first and second images such that the vanishing point in the first image and the vanishing point in the second image are in the same height in the vertical direction. The display device displays the synthetic image generated by the image synthesis unit.

More specifically, in the above vehicle surrounding image display device, the image deformation unit may deform the second image in the synthetic image such that, at the boundary between the first and second images on the lower end of the first image, a line virtually set in the first image incorporated in the synthetic image and extending in the traveling direction of the vehicle from a boundary in the width direction of the vehicle is connected with a line virtually set in the second image incorporated in the synthetic image and extending in the traveling direction of the vehicle from the boundary in the width direction of the vehicle.

According to the above vehicle surrounding image display device, the second image taken by the second camera which takes the image behind the vehicle from the position off the center in the width direction of the vehicle is deformed such that at least the portion of the inner side in the vehicle width direction of the second image lower than the vanishing point in the second image is inclined to make the lower portion of the inner side located more outward in the vehicle width direction than the upper portion of the inner side, and that the inclination is gradually increased toward the lower end of the inner side. The deformed image is then synthesized with the first image taken by the first camera which takes the image behind the vehicle from the central position in the width direction of the vehicle. Thereby, a single synthetic image simulating the circumstances behind the user's own vehicle as observed from a single virtual viewpoint is generated, and the generated image is displayed on the display device. With the second image taken by the second camera thus deformed and combined, distortion of the images of other vehicles and the like located directly behind the user's own vehicle and diagonally behind the user's own vehicle on the left and right sides can be suppressed to a small amount by reducing the degree of deformation of the images in a range including these other vehicles and the like, while suppressing the occurrence of the misalignment of the white lines on the road surface and the like at the boundaries between the respective images near the own vehicle, i.e., the prominently observable misalignment of the white lines on the road surface and the like. Accordingly, it is possible to display a synthetic image simulating the circumstances behind the user's own vehicle as observed from a single virtual viewpoint in a more realistic form.

The above-described vehicle surrounding image display device may take an image behind the vehicle by using the second camera from the left side position in the width direction of the vehicle, and may further include a third camera for taking an image behind the vehicle from the right side position in the width direction of the vehicle. In this case, the image deformation unit deforms the second image taken by the second camera such that at least a portion of the right side in the vehicle width direction of the second image lower than the vanishing point in the second image is inclined to make the lower portion of the right side located more leftward in the vehicle width direction than the upper portion of the right side, and that the inclination is gradually increased toward the lower end of the right side. The image deformation unit further deforms the third image taken by the third camera such that at least a portion of the left side in the vehicle width direction of the third image lower than the vanishing point in the third image is inclined to make the lower portion of the left side located more rightward in the vehicle width direction than the upper portion of the left side, and that the inclination is gradually increased toward the lower end of the left side. Further, the image synthesis unit adjusts the sizes of the second and third images deformed by the image deformation unit and the first image taken by the first camera such that the scale of an object matches among the first to third images, and generates a synthetic image combining the first to third images such that the vanishing point in the second image, the vanishing point in the first image, and the vanishing point in the third image are in the same height in the vertical direction.

With this configuration, it is possible to display a synthetic image showing the circumstances behind the vehicle in a wider range in the lateral direction.

In this case, too, the image deformation unit may deform the second image in the synthetic image such that, at the boundary between the first and second images on the lower end of the first image, a line virtually set in the first image incorporated in the synthetic image and extending in the traveling direction of the vehicle from the left-side boundary in the width direction of the vehicle is connected with a line virtually set in the second image incorporated in the synthetic image and extending in the traveling direction of the vehicle from the left-side boundary in the width direction of the vehicle. The image deformation unit may further deform the third image in the synthetic image such that, at the boundary between the first and third images on the lower end of the first image, a line virtually set in the first image incorporated in the synthetic image and extending in the traveling direction of the vehicle from the right-side boundary in the width direction of the vehicle is connected with a line virtually set in the third image incorporated in the synthetic image and extending in the traveling direction of the vehicle from the right-side boundary in the width direction of the vehicle.

The above "vanishing point" is the same in meaning as the "point at infinity." If the vehicle travels on a flat road, the vanishing point of a camera is on the skyline. Meanwhile, the vanishing point is on the sea line, if the sea or the like lies behind the vehicle. Therefore, the above "vanishing point" can be read interchangeably as the "skyline" or the "sea line."

As described above, according to the present invention, it is possible to generate an image simulating the circumstances behind a user's own vehicle as observed from a single virtual viewpoint in a form as realistic as possible on the basis of images behind the vehicle taken by a plurality of cameras, and to provide the generated image to a user of the vehicle.

BRIEF DESCRIPTION OF THE DRAWINGS

a to d in FIG. 2, a to d in FIG. 3, and a to d in FIG. 4 are diagrams illustrating an example of an operation of generating a display image performed by the vehicle surrounding image display device according to the embodiment of the present invention.

a to e in FIG. 5 are diagrams illustrating examples of an operation of generating a display image performed by a conventional vehicle surrounding image display device.

DESCRIPTION OF THE PREFERRED EMBODIMENTS

Figure 1A:
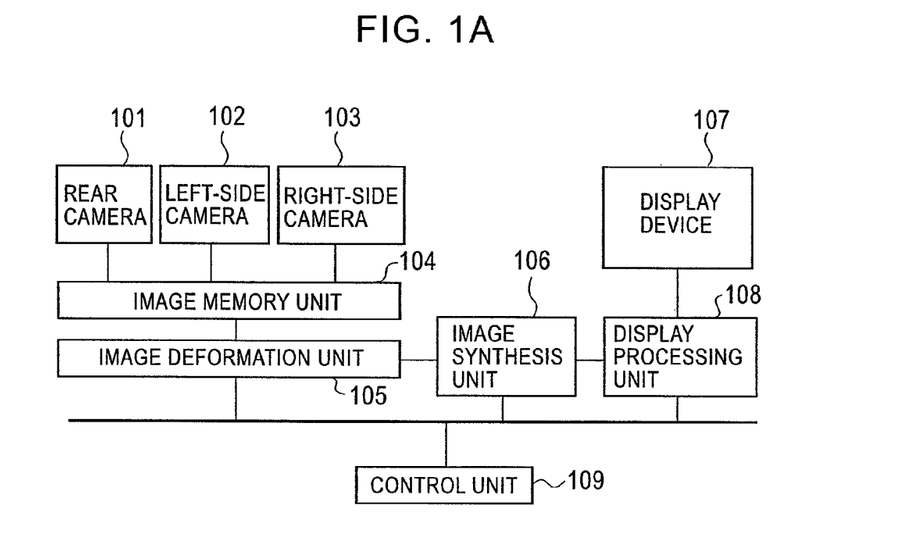
FIG. 1A is a block diagram illustrating a configuration of a vehicle surrounding image display device according to an embodiment of the present invention.
Figure 1B:
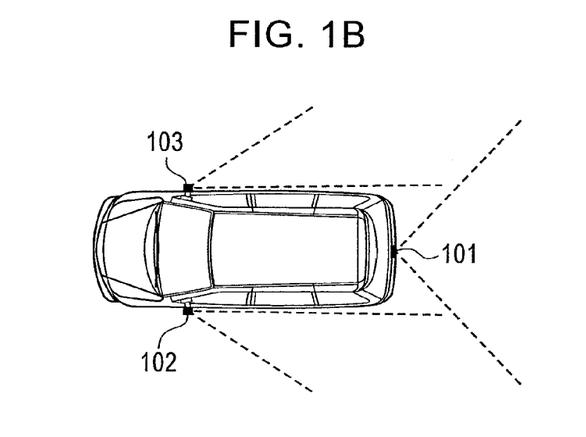
FIG. 1B is a diagram illustrating the configuration of the vehicle surrounding image display device according to the embodiment of the present invention, as viewed from above.

An embodiment of the present invention will now be described. As illustrated in FIGS. 1A and 1B, a vehicle surrounding image display device according to an embodiment of the present invention includes a rear camera 101 provided at the center of the rear side of a vehicle for taking an image behind the vehicle, a left-side camera 102 provided with a rearview mirror on the left side of the vehicle for taking an image behind the vehicle on the left side, a right-side camera 103 provided with a rearview mirror on the right side of the vehicle for taking an image behind the vehicle on the right side, an image memory unit 104 for retaining the images taken by the respective cameras, an image deformation unit 105, an image synthesis unit 106, a display device 107 provided in the interior of the vehicle, a display processing unit 108 for controlling the display on the display device 107, and a control unit 109 for controlling the above respective components.

Figure 2:
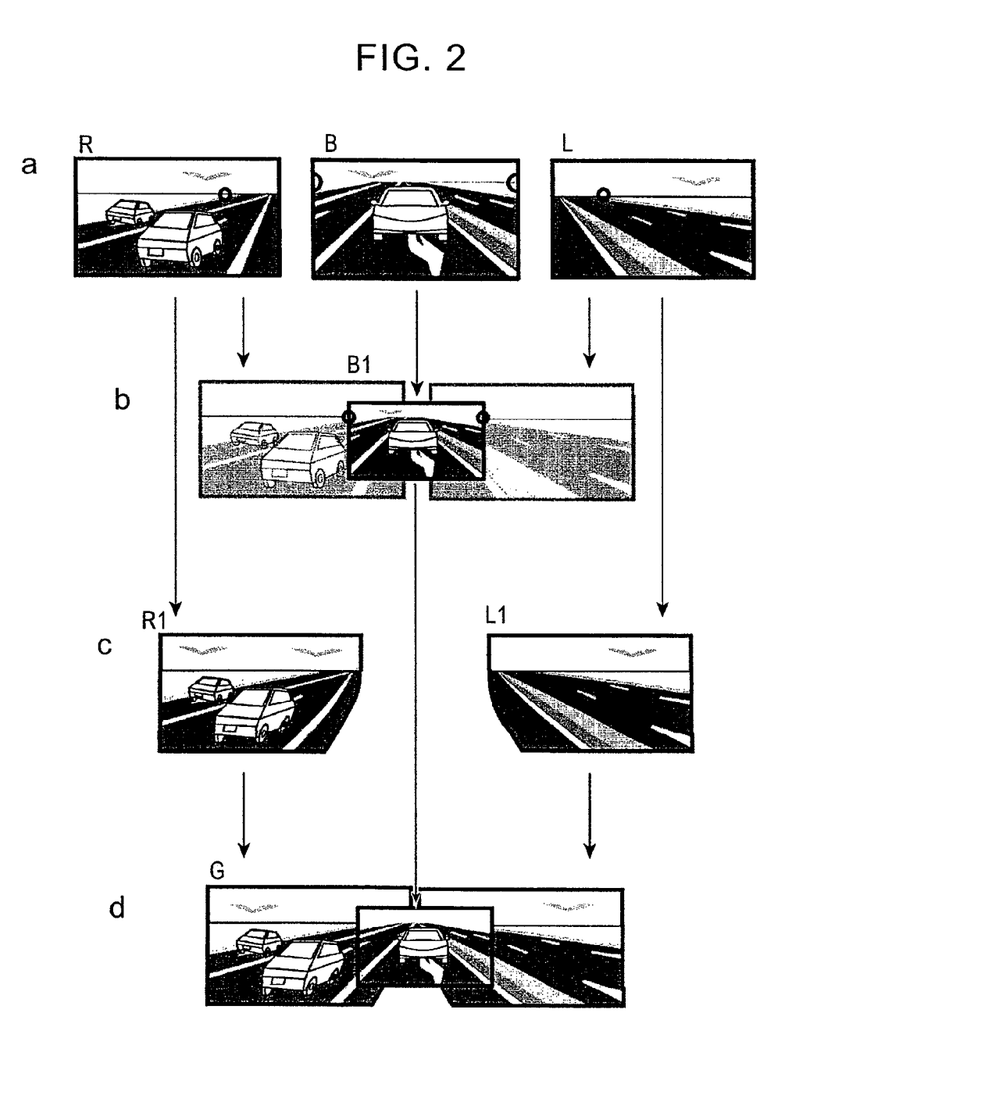

In the above configuration, as illustrated in a in FIG. 2, when images R, B, and L are taken by the right-side camera 103, the rear camera 101, and the left-side camera 102, respectively, the respective images are stored in the image memory unit 104.

Then, the image deformation unit 105 reads out and deforms the respective images R, B, and L stored in the image memory unit 104.

That is, as illustrated in b in FIG. 2, the image B taken by the rear camera 101 is reduced in size relative to the other images R and L such that objects or landscapes (indicated by circle marks in the drawing) included at the opposite ends on a line passing through the vanishing point in the image B and extending in the horizontal direction (or on the skyline) have the same scale as the same objects or landscapes included in the other images R and L. Thereby, an image B1 is generated. The reduction ratio of this relative size reduction has been previously set in accordance with such factors as the positions and the field angles of the respective cameras 101, 102, and 103. Thus, the image deformation unit 105 performs a process of simply reducing the size of the image B with the above reduction ratio. Then, as illustrated in c in FIG. 2, the images R and L taken by the right-side camera 103 and the left-side camera 102, respectively, are deformed to thereby generate images R1 and L1, respectively. The process to deform the images R and L into the images R1 and L1 will be later described in detail.

Then, the image synthesis unit 106 combines the respective images B1, R1, and L1 deformed by the image deformation unit 105, as illustrated in d in FIG. 2. Thus, a single image G simulating the circumstances behind the user's own vehicle as observed from a single virtual viewpoint is generated. The generated image G is then displayed on the display device 107 via the display processing unit 108. The synthesis of the images B1, R1, and L1 by the image synthesis unit 106 is carried out by partially overlapping the respective images such that the vanishing points of the respective images are at the same height in the vertical direction (or the skylines of the respective images are continued in the horizontal direction), the left end position on a line passing through the vanishing point in the image B1 and extending in the horizontal direction (or on the skyline) is overlapped with a position on the image R1 including the same object or landscape as the object or landscape included at the left end position, and the right end position on the line passing through the vanishing point in the image B1 and extending in the horizontal direction (or on the skyline) is overlapped with a position on the image L1 including the same object or landscape as the object or landscape included at the right end position. In the arrangement of the respective images B1, R1, and L1, the image B1 is used as the image forming the overlapped portions of the synthesized image, i.e., the overlapped portion of the images B1 and R1 and the overlapped portion of the images B1 and L1. That is, the image B1 is placed in front of the images R1 and L1 so that the image B1 is viewable at the overlapped portions.

Detailed description will now be made of the deformation process performed by the image deformation unit 105 to deform the images R and L illustrated in a in FIG. 2 into the images R1 and L1 illustrated in c in FIG. 2.

The process to deform the image R illustrated in a in FIG. 2 into the image R1 illustrated in c in FIG. 2 will be first described. In this process, the image R is first divided into three images RU, RM, and RD, as illustrated in a in FIG. 3. The image RU (first divided image) is an image included in a region above a line passing through the vanishing point of the image R and extending in the horizontal direction (or the skyline). As illustrated in a-1 in FIG. 3, the image RD (second divided image) is an image included in a lower region of the image R below the lower end of the image B1, when the image R is arranged with respect to the image B1 such that the left end position on the line which passes through the vanishing point in the image B1 illustrated in b in FIG. 2 and generated by reducing the size of the image B taken by the rear camera 101 and which extends in the horizontal direction (or on the skyline) is overlapped with the position on the image R including the same object or landscape as the object or landscape included at the left end position. The image RM (third divided image) is an image included in the remaining region of the image R.

The image RD of the thus divided three images is deformed as follows. That is, as illustrated in b in FIG. 3, the image RD is arranged with respect to the image B1 in the same relationship as that of the image R arranged with respect to the image B1 as illustrated in a-1 in FIG. 3. Then, a line 301 extended from the right-side boundary of the width of the user's own vehicle in the traveling direction of the vehicle is virtually set on the image B1. Further, a line 302 extended from the right end position of the width of the user's own vehicle in the traveling direction of the vehicle is virtually set on the image RD. The positions and the inclinations of these lines 301 and 302 on the respective images B1 and RD have been previously set in accordance with such factors as the positions and the field angles of the respective cameras 101 and 103.

Figure 3:
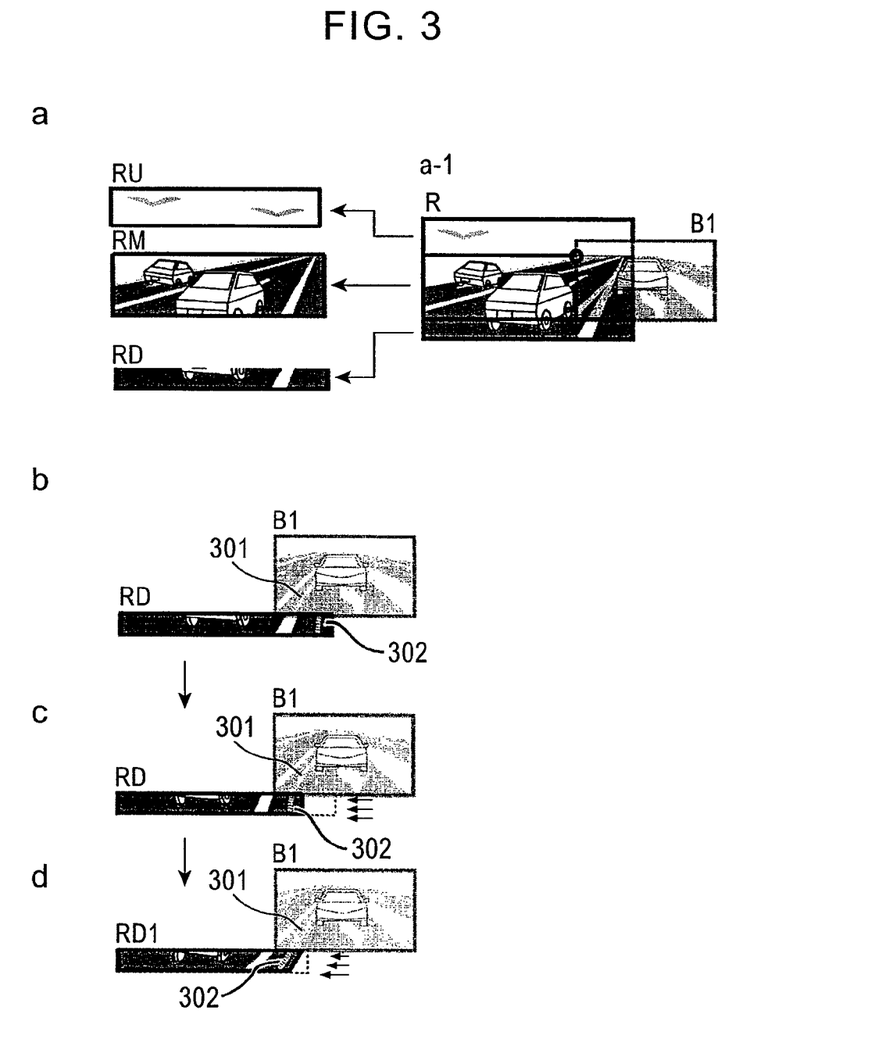

Then, as illustrated in c in FIG. 3, while keeping the left end position of the image RD unchanged, the image RD is reduced in size in the horizontal direction such that the upper end of the line 302, which represents the right end of the width of the user's own vehicle on the image RD, is connected with the lower end of the line 301, which represents the right end of the width of the user's own vehicle on the image B1.

Thereafter, as illustrated in d in FIG. 3, while keeping the upper end of the line 302 and the lower end of the line 301 connected with each other, the image RD is deformed such that the inclination of the line 302 representing the right end of the width of the user's own vehicle on the image RD matches the inclination of the line 301 representing the right end of the width of the user's own vehicle on the image B1. Thereby, an image RD1 is generated. This deformation is carried out as respective horizontal lines forming the image RD are reduced in size in the horizontal direction with greater reduction ratios for the lower horizontal lines, while keeping the left end position of the image RD unchanged. However, the reduction ratio of the uppermost horizontal line is set to be 1 to 1.

Then, the image RM (third divided image) of the three images divided as illustrated in a in FIG. 3 is deformed as follows. As illustrated in a in FIG. 4, the image RM is first divided in the vertical direction at equal intervals into n regions. a-1 in FIG. 4 illustrates a case in which the image RM is divided in the vertical direction at equal intervals into four regions.

Figure 4:
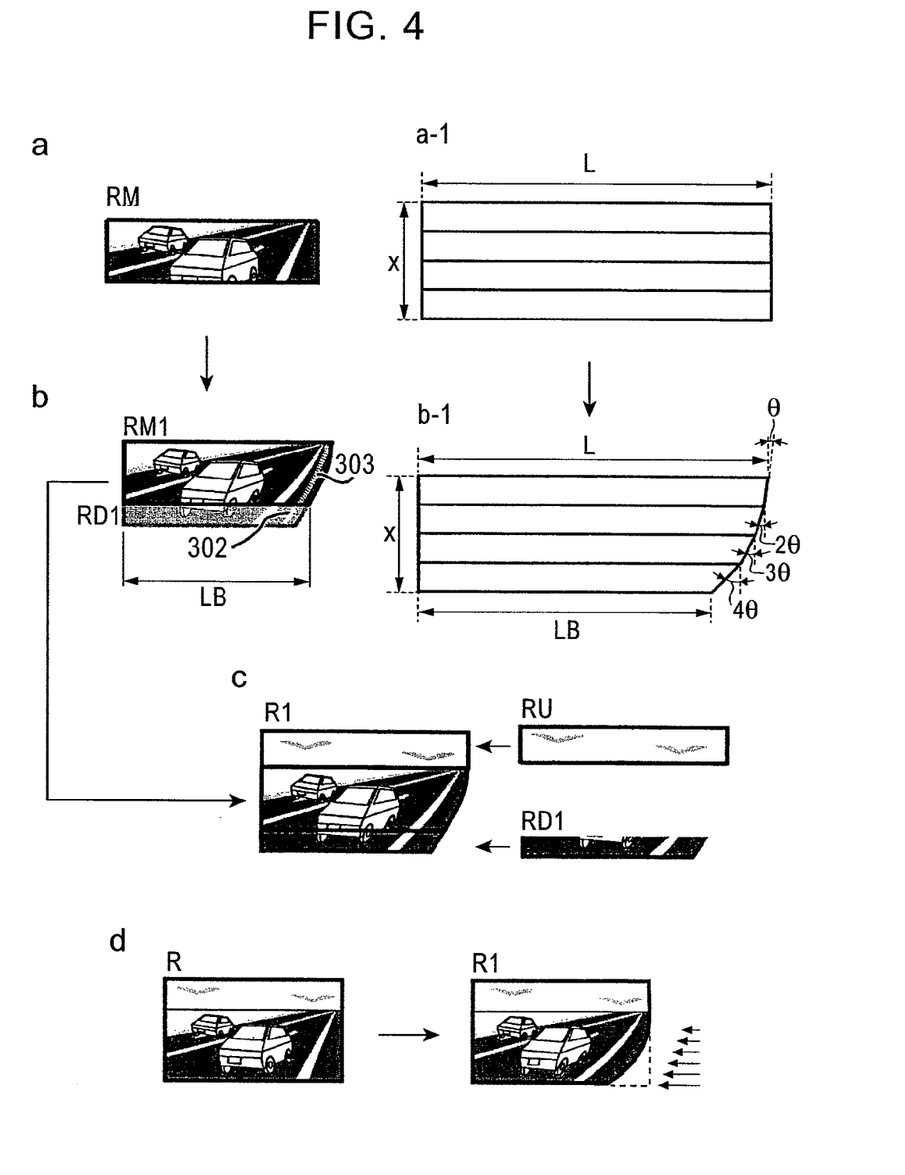

Then, as illustrated in b in FIG. 4, the respective divided regions are deformed to generate an image RM1. That is, the uppermost region of the image RM divided as illustrated in a-1 in FIG. 4 is deformed such that a length L of the upper side of the region is equal to the length of the lower side of the image RU, and that the angle of a clockwise inclination with respect to the vertical direction of the right side of the region is θ. As for the other divided regions of the image RM, if the region to be deformed is the i-th region from the top, for example, the i-th region is deformed such that the length of the upper side of the region is equal to the length of the lower side of the (i−1)th region which is located immediately above the i-th region, and that the angle of a clockwise inclination with respect to the vertical direction of the right side of the i-th region is iθ. This deformation of each of the regions is carried out as respective horizontal lines forming the region are reduced in size in the horizontal direction with greater reduction ratios for the lower horizontal lines, while keeping the left end position of the region unchanged. The value θ is determined to match a length LB of the lower side of the lowermost region of the divided n regions with the length of the upper side of the image RD1 generated as illustrated in d in FIG. 3.

That is, the value θ is determined to satisfy the following formula (1) in accordance with the division number N, when the length in the vertical direction of the image RM is expressed as x.

$$L - LB = \sum_{i=1}^{i=N} \frac{x \tan(i\theta)}{N} \quad (1)$$

b-1 in FIG. 4 illustrates the case in which the image RM is divided in the vertical direction at equal intervals into four regions. In this case, as illustrated in the drawing, the obtained image RM1 is such that the inclination of the right side of the respective regions is gradually increased in each of the regions, ranging from θ to 4θ.

Further, as illustrated in b in FIG. 4, a line 303, which is virtually set on the image RM1 and extends from the right-side boundary of the width of the user's own vehicle in the traveling direction of the vehicle, is smoothly continued to the line 302, which extends from the right-side boundary of the width of the user's own vehicle in the traveling direction of the vehicle and is virtually set on the image RD1 arranged below the image RM1 with the left sides of the two images aligned with each other.

After the image RM1 has been thus generated, the image RM1 is combined with the image RD1 generated as illustrated in d in FIG. 3 and the image RU included in the region above the line passing through the vanishing point of the image R and extending in the horizontal direction (or the skyline). Thus, as illustrated in c in FIG. 4, the image R1 is completed, with the left sides of the above three images aligned with one another. As a result, the inclination of the right side of the image R1 is gradually increased from the top toward the bottom.

The process performed by the image deformation unit 105 to deform the image R into the image R1 has been described. The process may be practically implemented by performing a fixed deformation equivalent to the above-described process on the entirety of the image R. That is, a fixed deformation as illustrated in d in FIG. 4, which gradually increases, from the top toward the bottom, the inclination of the right side previously determined in accordance with such factors as the positions and the field angles of the respective cameras 101, 102, and 103, for example, may be implemented as a process performed on the entirety of the image R.

The deformation process performed by the image deformation unit 105 to deform the image L illustrated in a in FIG. 2 into the image L1 illustrated in c in FIG. 2 is symmetrical in the horizontal direction with respect to the above-described deformation process of deforming the image R into the image R1. Therefore, a detailed description of this deformation process will be omitted.

As described above, according to the present embodiment, the image B1 is obtained by reducing in size the image B taken by the rear camera 101 provided at the center of the rear side of the vehicle. Meanwhile, the images R1 and L1 are obtained by deforming the images R and L taken by the cameras 102 and 103 provided with the rearview mirrors on the left and right sides of the vehicle such that the outward inclination of the inner side of each of the images R and L is gradually increased toward the lower end of the inner side. The obtained images B1, R1, and L1 are then combined to generate the single image G which simulates the circumstances behind the user's own vehicle as observed from a single virtual viewpoint, and the generated image G is displayed on the display device 107. As understood from d in FIG. 2, with the images taken by the respective cameras thus deformed and combined, the degree of deformation of the images in the range including other vehicles and the like located directly behind the user's own vehicle or diagonally behind the user's own vehicle on the left and right sides is decreased, while the misalignment of the lines on the road surface and the like is prevented at the boundaries between the respective images near the user's own vehicle. Thus, the distortion of the images of such other vehicles and the like can be suppressed to a small amount. Accordingly, an image simulating the circumstances behind the user's own vehicle as observed from a single virtual viewpoint can be displayed in a more realistic form.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle surrounding image display device mounted on a vehicle, the device comprising:
   a first camera for taking a first image behind the vehicle from a central position in the width direction of the vehicle;
   a second camera for taking a second image behind the vehicle from a position off the center in the width direction of the vehicle;
   image deformation means for deforming the second image taken by the second camera such that at least a portion of the inner side in the vehicle width direction of the second image lower than the vanishing point in the second image is inclined to make the lower portion of the inner side located more outward in the vehicle width direction than the upper portion of the inner side, and that the inclination is gradually increased toward the lower end of the inner side;

image synthesis means for adjusting the second image deformed by the image deformation means and the first image taken by the first camera such that the scale of an object matches between the first and second images, and for generating a synthetic image combining the first and second images such that the vanishing point in the first image and the vanishing point in the second image are at the same height in the vertical direction; and a display device for displaying the synthetic image generated by the image synthesis means.

2. The vehicle surrounding image display device according to claim 1, wherein the image deformation means deforms the second image in the synthetic image such that, at the boundary between the first and second images on the lower end of the first image, a line virtually set in the first image incorporated in the synthetic image and extending in the traveling direction of the vehicle from a boundary in the width direction of the vehicle is connected with a line virtually set in the second image incorporated in the synthetic image and extending in the traveling direction of the vehicle from the boundary in the width direction of the vehicle.

3. The vehicle surrounding image display device according to claim 2, wherein the image deformation means further deforms the second image such that the inclination of the line virtually set in the first image and extending in the traveling direction of the vehicle from the boundary in the width direction of the vehicle matches the inclination of the line virtually set in the second image and extending in the traveling direction of the vehicle from the boundary in the width direction of the vehicle.

4. The vehicle surrounding image display device according to claim 3, wherein the image deformation means deforms the second image by reducing, in the horizontal direction, the sizes of respective horizontal lines forming the second image with greater reduction ratios for the lower horizontal lines, while keeping the position of the outer side in the vehicle width direction of the second image unchanged.

5. The vehicle surrounding image display device according to claim 1, wherein the image deformation means divides the second image into a first divided image above a line passing through the vanishing point of the second image and extending in the horizontal direction, a second divided image below the first image incorporated in the synthetic image within the synthetic image, and a third divided image sandwiched between the first and second divided images, and wherein the image deformation means deforms the second image such that, at the boundary between the first image and the second divided image of the second image on the lower end of the first image, a line virtually set in the first image and extending in the traveling direction of the vehicle from a boundary in the width direction of the vehicle is connected with a line virtually set in the second divided image and extending in the traveling direction of the vehicle from the boundary in the width direction of the vehicle.

6. The vehicle surrounding image display device according to claim 5, wherein the image deformation means further deforms the second divided image such that the inclination of the line virtually set in the first image and extending in the traveling direction of the vehicle from the boundary in the width direction of the vehicle matches the inclination of the line virtually set in the second divided image and extending in the traveling direction of the vehicle from the boundary in the width direction of the vehicle.

7. The vehicle surrounding image display device according to claim 6, wherein the image deformation means deforms the second divided image by reducing, in the horizontal direction, the sizes of respective horizontal lines forming the second divided image with greater reduction ratios for the lower horizontal lines, while keeping the position of the outer side in the vehicle width direction of the second divided image unchanged.

8. The vehicle surrounding image display device according to claim 5, wherein the image deformation means divides the third divided image of the second image in the vertical direction at equal intervals into a plurality of divided regions, and wherein the image deformation means deforms images of the respective divided regions such that the length of the upper side of the uppermost divided region matches the length of the lower side of the first divided image, the length of the lower side of the lowermost divided region matches the length of the upper side of the second divided image, and that the inclination of the inner side in the vehicle width direction of the respective divided regions is gradually increased toward the lower divided regions.

9. The vehicle surrounding image display device according to claim 1, wherein the image synthesis means arranges the first and second images by partially overlapping the images such that an end position of the first image on a line passing through the vanishing point in the first image and extending in the horizontal direction is overlapped with a position on the second image including the same object or landscape as an object or landscape included at the end position.

10. The vehicle surrounding image display device according to claim 9, wherein the image synthesis means arranges the first image in front of the second image at the overlapped portion of the first and second images.

11. A vehicle surrounding image display device mounted on a vehicle, the device comprising:

a first camera for taking a first image behind the vehicle from a central position in the width direction of the vehicle;

a second camera for taking a second image behind the vehicle from a left side position in the width direction of the vehicle;

a third camera for taking a third image behind the vehicle from a right side position in the width direction of the vehicle;

image deformation means for deforming the second image taken by the second camera such that at least a portion of the right side in the vehicle width direction of the second image lower than the vanishing point in the second image is inclined to make the lower portion of the right side located more leftward in the vehicle width direction than the upper portion of the right side, and that the inclination is gradually increased toward the lower end of the right side, and for deforming the third image taken by the third camera such that at least a portion of the left side in the vehicle width direction of the third image lower than the vanishing point in the third image is inclined to make the lower portion of the left side located more rightward in the vehicle width direction than the upper portion of the left side, and that the inclination is gradually increased toward the lower end of the left side;

image synthesis means for adjusting the second and third images deformed by the image deformation means and the first image taken by the first camera such that the scale of an object matches among the first to third images, and for generating a synthetic image combining the first to third images such that the vanishing point in the first image, the vanishing point in the second image, and the vanishing point in the third image are at the same height in the vertical direction; and a display device for displaying the synthetic image generated by the image synthesis means.

12. The vehicle surrounding image display device according to claim 11, wherein the image deformation means deforms the second image in the synthetic image such that, at the boundary between the first and second images on the lower end of the first image, a line virtually set in the first image incorporated in the synthetic image and extending in the traveling direction of the vehicle from the left-side boundary in the width direction of the vehicle is connected with a line virtually set in the second image incorporated in the synthetic image and extending in the traveling direction of the vehicle from the left-side boundary in the width direction of the vehicle, and wherein the image deformation means deforms the third image in the synthetic image such that, at the boundary between the first and third images on the lower end of the first image, a line virtually set in the first image incorporated in the synthetic image and extending in the traveling direction of the vehicle from the right-side boundary in the width direction of the vehicle is connected with a line virtually set in the third image incorporated in the synthetic image and extending in the traveling direction of the vehicle from the right-side boundary in the width direction of the vehicle.

13. The vehicle surrounding image display device according to claim 12, wherein the image deformation means further deforms the second image such that the inclination of the line virtually set in the first image and extending in the traveling direction of the vehicle from the left-side boundary in the width direction of the vehicle matches the inclination of the line virtually set in the second image and extending in the traveling direction of the vehicle from the left-side boundary in the width direction of the vehicle, and wherein the image deformation means further deforms the third image such that the inclination of the line virtually set in the first image and extending in the traveling direction of the vehicle from the right-side boundary in the width direction of the vehicle matches the inclination of the line virtually set in the third image and extending in the traveling direction of the vehicle from the right-side boundary in the width direction of the vehicle.

14. The vehicle surrounding image display device according to claim 13, wherein the image deformation means deforms the second image by reducing, in the horizontal direction, the sizes of respective horizontal lines forming the second image with greater reduction ratios for the lower horizontal lines, while keeping the position of the outer side in the vehicle width direction of the second image unchanged, and wherein the image deformation means deforms the third image by reducing, in the horizontal direction, the sizes of respective horizontal lines forming the third image with greater reduction ratios for the lower horizontal lines, while keeping the position of the outer side in the vehicle width direction of the third image unchanged.

15. The vehicle surrounding image display device according to claim 11, wherein the image deformation means divides the second image into a first divided image above a line passing through the vanishing point of the second image and extending in the horizontal direction, a second divided image below the first image incorporated in the synthetic image within the synthetic image, and a third divided image sandwiched between the first and second divided images, wherein the image deformation means deforms the second divided image of the second image such that, at the boundary between the first image and the second divided image of the second image on the lower end of the first image, a line virtually set in the first image and extending in the traveling direction of the vehicle from the left-side boundary in the width direction of the vehicle is connected with a line virtually set in the second divided image of the second image and extending in the traveling direction of the vehicle from the left-side boundary in the width direction of the vehicle, wherein the image deformation means divides the third image into a first divided image above a line passing through the vanishing point of the third image and extending in the horizontal direction, a second divided image below the first image incorporated in the synthetic image within the synthetic image, and a third divided image sandwiched between the first and second divided images, and wherein the image deformation means deforms the second divided image of the third image such that, at the boundary between the first image and the second divided image of the third image on the lower end of the first image, a line virtually set in the first image and extending in the traveling direction of the vehicle from the right-side boundary in the width direction of the vehicle is connected with a line virtually set in the second divided image of the third image and extending in the traveling direction of the vehicle from the right-side boundary in the width direction of the vehicle.

16. The vehicle surrounding image display device according to claim 15, wherein the image deformation means further deforms the second divided image of the second image such that the inclination of the line virtually set in the first image and extending in the traveling direction of the vehicle from the left-side boundary in the width direction of the vehicle matches the inclination of the line virtually set in the second divided image of the second image and extending in the traveling direction of the vehicle from the left-side boundary in the width direction of the vehicle, and wherein the image deformation means further deforms the second divided image of the third image such that the inclination of the line virtually set in the first image and extending in the traveling direction of the vehicle from the right-side boundary in the width direction of the vehicle matches the inclination of the line virtually set in the second divided image of the third image and extending in the traveling direction of the vehicle from the right-side boundary in the width direction of the vehicle.

17. The vehicle surrounding image display device according to claim 16, wherein the image deformation means deforms the respective second divided images of the second and third images by reducing, in the horizontal direction, the sizes of respective horizontal lines forming the respective second divided images of the second and third images with greater reduction ratios for the lower horizontal lines, while keeping the position of the outer side in the vehicle width direction of each of the second divided images unchanged.

18. A vehicle image display method for displaying an image showing the circumstances behind a vehicle in a vehicle surrounding image display device mounted on the vehicle and including a first camera for taking a first image behind the vehicle from a central position in the width direction of the vehicle, and a second camera for taking a second image behind the vehicle from a position off the center in the width direction of the vehicle, the method comprising:

deforming the second image taken by the second camera such that at least a portion of the inner side in the vehicle width direction of the second image lower than the vanishing point in the second image is inclined to make the lower portion of the inner side located more outward in the vehicle width direction than the upper portion of the inner side, and that the inclination is gradually increased toward the lower end of the inner side;

adjusting the sizes of the deformed second image and the first image taken by the first camera such that the scale of an object matches between the first and second images, and generating a synthetic image combining the first and second images such that the vanishing point in the first image and the vanishing point in the second image are at the same height in the vertical direction; and displaying the generated synthetic image.

19. A vehicle image display method for displaying an image showing the circumstances behind a vehicle in a vehicle surrounding image display device mounted on the vehicle and including a first camera for taking a first image behind the vehicle from a central position in the width direction of the vehicle, a second camera for taking a second image behind the vehicle from a left-side position in the width direction of the vehicle, and a third camera for taking a third image behind the vehicle from a right-side position in the width direction of the vehicle, the method comprising:

deforming the second image taken by the second camera such that at least a portion of the right side in the vehicle width direction of the second image lower than the vanishing point in the second image is inclined to make the lower portion of the right side located more leftward in the vehicle width direction than the upper portion of the right side, and that the inclination is gradually increased toward the lower end of the right side;

deforming the third image taken by the third camera such that at least a portion of the left side in the vehicle width direction of the third image lower than the vanishing point in the third image is inclined to make the lower portion of the left side located more rightward in the vehicle width direction than the upper portion of the left side, and that the inclination is gradually increased toward the lower end of the left side;

adjusting the sizes of the deformed second and third images and the first image taken by the first camera such that the scale of an object matches among the first to third images, and generating a synthetic image combining the first to third images such that the vanishing point in the first image, the vanishing point in the second image, and the vanishing point in the third image are at the same height in the vertical direction; and displaying the generated synthetic image.

* * * * *